(12) United States Patent
Becker et al.

(10) Patent No.: US 8,848,837 B2
(45) Date of Patent: Sep. 30, 2014

(54) STATISTICAL PROCEDURES FOR CARRIER FREQUENCY TRACKING

(75) Inventors: Burkhard Becker, Ismaning (DE); Stefan Fechtel, Zorneding (DE)

(73) Assignee: Intel Mobile Communications GmbH, Neubiberg (DE)

( * ) Notice: Subject to any disclaimer, the term of this patent is extended or adjusted under 35 U.S.C. 154(b) by 2575 days.

(21) Appl. No.: 11/583,298

(22) Filed: Oct. 19, 2006

(65) Prior Publication Data
US 2008/0095274 A1     Apr. 24, 2008

(51) Int. Cl.
*H04L 27/14*     (2006.01)
*H04L 27/00*     (2006.01)

(52) U.S. Cl.
CPC ..... *H04L 27/0014* (2013.01); *H04L 2027/0046* (2013.01); *H04L 2027/0065* (2013.01); *H04L 2027/0026* (2013.01)
USPC ........... 375/326; 375/325; 375/352; 375/229; 455/63.1

(58) Field of Classification Search
USPC ............ 375/326, 325, 354, 229; 455/63, 63.1
See application file for complete search history.

(56) References Cited

U.S. PATENT DOCUMENTS

| | | | | |
|---|---|---|---|---|
| 6,324,382 B1 * | 11/2001 | Dolder | ......................... | 455/63.1 |
| 6,519,296 B1 * | 2/2003 | Hladik | ......................... | 375/325 |
| 6,549,592 B1 * | 4/2003 | Jones | ............................. | 375/354 |
| 7,620,125 B1 * | 11/2009 | Chang et al. | .................. | 375/326 |
| 7,643,549 B2 * | 1/2010 | Chen | ............................. | 375/229 |

OTHER PUBLICATIONS

"Carrier Frequency Recovery in All-Digital Modems for Burst-Mode Transmissions", Marco Luise and Ruggero Reggiannini, IEEE Transactions on Communications, vol. 43, No. 2/3/4, Feb./Mar./Apr. 1995, pp. 1169-1178.
Umberto Mengali, et al., "Synchronization Techniques for Digital Receivers", Plenum Press, 1997, p. 79-99.

* cited by examiner

*Primary Examiner* — Eva Puente
(74) *Attorney, Agent, or Firm* — Eschweiler & Associates, LLC

(57) ABSTRACT

A method for carrier frequency tracking of a received signal having a burst structure includes dividing each burst into a number of segments. The carrier frequency offset of a first segment within a burst is measured to obtain a first segment carrier frequency offset measurement value. The carrier frequency offset of a second segment within the burst is corrected by a second segment carrier frequency offset correction value based on the first segment carrier frequency offset measurement value.

27 Claims, 11 Drawing Sheets

US 8,848,837 B2

STATISTICAL PROCEDURES FOR CARRIER FREQUENCY TRACKING

FIELD OF THE INVENTION

The invention relates to carrier frequency tracking of a received signal in communications systems, and more specifically to statistical procedures to improve carrier frequency tracking efficiency in communications systems.

BACKGROUND OF THE INVENTION

In communications systems, in particular in wireless radio systems, co-channel interference (CCI) and carrier frequency offset (CFO) are well-known effects which degrade the quality of the received signal. CCI is caused by an interferer signal having substantially the same carrier frequency as a user signal to be detected. Typically, CCI suppression is accomplished by filtering the received signal with an appropriate filter structure.

CFO can be present in the user signal or the interferer signal or in both signals. CFO causes CCI suppression to deteriorate quickly with increasing distance from a training-sequence in the transmitted signal, leading to a decrease in signal quality. Typically, CFO compensation is done by measuring CFO and correcting the received signal by the measured frequency offset. CFO compensation is used for carrier frequency tracking.

The efficiency of CFO compensation depends on the CFO measurement equipment and on the algorithm and mathematical procedure for calculating the CFO correction quantity to be applied for signal frequency correction.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

A method for carrier frequency tracking of a received signal having a burst structure is provided and comprises dividing a burst into a number of segments, and measuring a carrier frequency offset of a first segment within the burst to obtain a first segment carrier frequency offset measurement value. The method further comprises correcting a carrier frequency offset of a second segment within the burst by a second segment carrier frequency offset correction value based on the first segment carrier frequency offset measurement value.

A device for carrier frequency tracking of a received signal having a burst structure is also provided and comprises a divider configured to divide a burst into a number of segments, and a measuring unit configured to measure carrier frequency offsets of the segments, wherein the measured carrier frequency offset of a first segment within the burst is denoted as a first segment carrier frequency offset measurement value. The device further comprises a correction unit configured to correct the carrier frequency offsets of the segments, wherein the correction unit is further configured to correct the frequency offset of a second segment within the burst by a second segment carrier frequency offset correction value based on the first segment carrier frequency offset measurement value.

The following description and annexed drawings set forth in detail certain illustrative aspects and implementations of the invention. These are indicative of but a few of the various ways in which the principles of the invention may be employed.

BRIEF DESCRIPTION OF THE DRAWINGS

Aspects of the invention are made more evident in the following detailed description of embodiments when read in conjunction with the attached drawing figures, wherein.

DETAILED DESCRIPTION OF THE INVENTION

Figure 1:
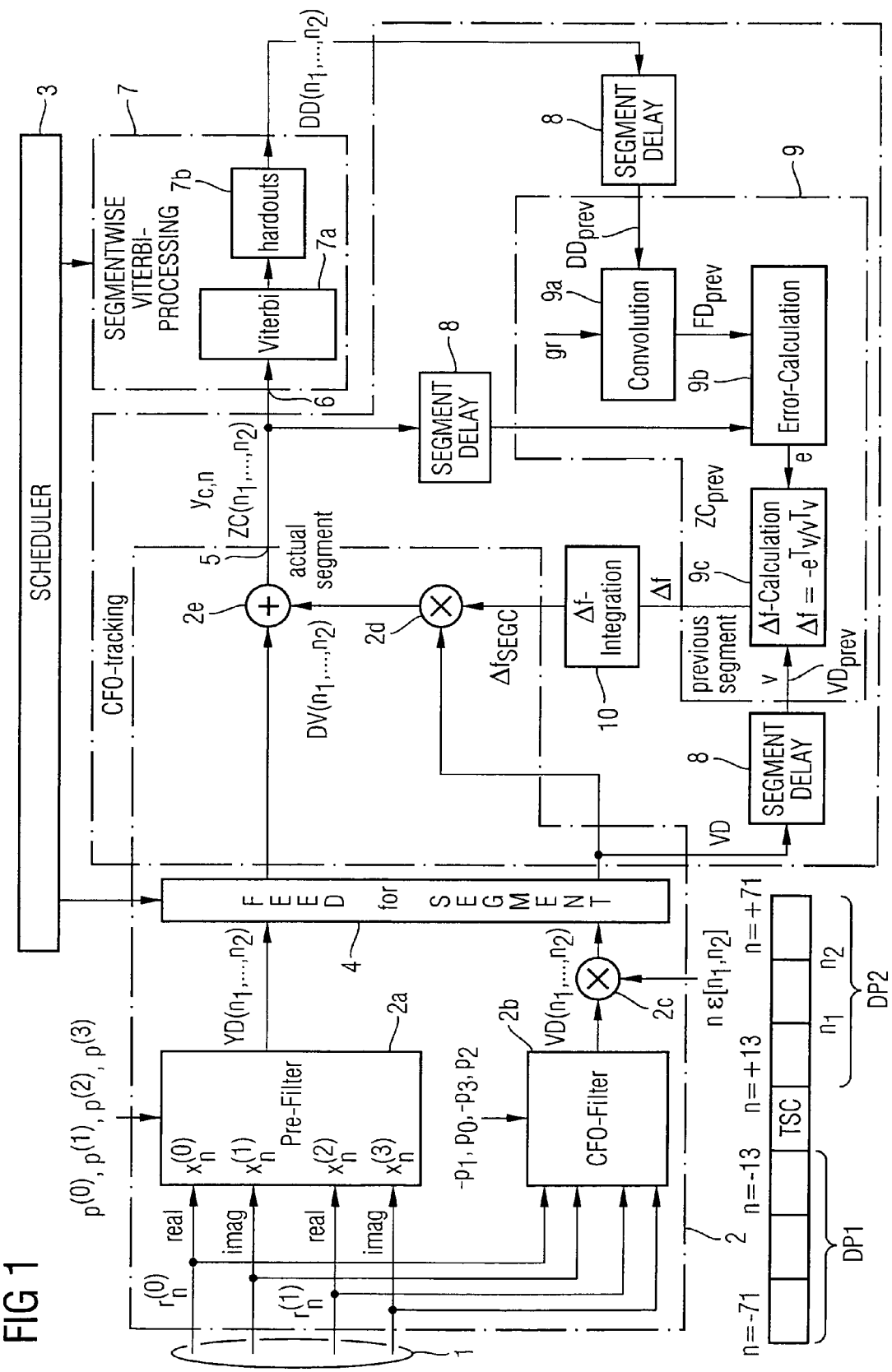
FIG. 1 is a block diagram of an embodiment of a receiver configured to perform carrier frequency tracking.

FIG. 1 depicts in an exemplary fashion a receiver structure configured for CFO-tracking in accordance with embodiments of the invention. It is to be noted that a variety of modifications and variations of such receiver structure is possible without departing from the concepts underlying this invention.

An input signal 1 comprising first and second I/Q-polyphase signals $r_n^{(0)}$, $r_n^{(1)}$ is input into a filter-and-rotation stage 2. $r_n^{(0)}$, $r_n^{(1)}$ are complex symbols, n denotes the discrete time and the upper bracketed indices 0, 1 denote the polyphases. The real and imaginary parts of the received I/Q-polyphase signal $r_n^{(0)}$ are denoted by $x_n^{(0)}$, $x_n^{(1)}$, respectively, and the real and imaginary parts of the received I/Q-polyphase signal $r_n^{(1)}$ are denoted by $x_n^{(2)}$, $x_n^{(3)}$, respectively. The signals $x_n^{(0)}$, $x_n^{(1)}$, $x_n^{(2)}$, $x_n^{(3)}$ may be regarded as signals from virtual antennas. They may be generated by two antennas, wherein a first antenna receives the first polyphase signal $r_n^{(0)}$ and the second antenna receives the second polyphase signal $r_n^{(1)}$. Another possibility to generate two polyphase signals $r_n^{(0)}$, $r_n^{(1)}$ is to use one antenna and to sample the antenna signal with a sampling rate which is twice the symbol rate. In this case, the polyphase signals $r_n^{(0)}$ and $r_n^{(1)}$ may be termed "half-symbols" because one of the polyphase signals comprises "early" samples and the other polyphase signal comprises "late" samples of the received symbols. Of course, it is equally possible to use signals having more than two polyphases.

The receiver comprises a scheduler 3 for segmented burst processing. Typically, the input signal 1 (i.e. both polyphase signals $r_n^{(0)}$, $r_n^{(1)}$) is organized in bursts. FIG. 1, in the lower left part, illustrates an exemplary structure of a burst. This burst contains a leading data part DP1, a training-sequence TSC and a trailing data part DP2. The training-sequence TSC is termed midamble because it is arranged between DP1 and DP2. However, training-sequence TSC must not be a midamble but may equally be arranged at the beginning or end of the burst.

In the lower left part of FIG. 1, as an example, n=−71 is associated with the first symbol in the burst, the training-sequence has a length of 26 symbols and n=+71 is associated with the last symbol of the burst. This conforms with a GSM (Global System for Mobile Communications) burst. However, other mobile communications systems or standards including, inter alia, CDMA (Code Division Multiple Access) systems and related standards may be used and are contemplated as falling within the scope of the present invention. The scheduler 3 divides the data parts DP1, DP2 of the burst into a number of segments. Typically, each segment only comprises a relatively low number of symbols. This number may be, for instance, on the order of one or several tens of symbols per segment. In FIG. 1, a segment is determined by indices $[n_1, n_2]$.

The scheduler 3 controls a data segmenting device 4 providing for burst segmentation as explained above. The data segmenting device 4 is arranged within the data signal path and may be part of the filter-and-rotation stage 2 in one embodiment.

An output 5 of the filter-and-rotation stage 2 provides a filtered and CFO-compensated output signal containing symbols $y_{c,n}$. A vector $ZC(n_1, \ldots, n_2)$ of output symbols $y_{c,n}$ represents the symbols $y_{c,n}$ within one segment $[n_1, n_2]$.

The output 5 of the filter-and-rotation stage 2 is coupled to the input 6 of a data decision unit 7. In the embodiment depicted in FIG. 1, the data decision unit 7 is a Viterbi-processing unit comprising a Viterbi-processor 7a and a unit 7b generating Viterbi hard-output values of the actual segment. As known in the art, hard-output values are decided symbols, in particular bits. $DD(n_1, \ldots, n_2)$ is a vector of hard-output values representing one segment provided by the unit 7b.

It is to be noted that the data decision unit 7 may equally be any other data decision unit, e.g. a slicer with decision feedback structure, etc.

The hard-output values $DD(n_1, \ldots, n_2)$ are fed into a segment delay unit 8. The segment delay unit 8 comprises memory and provides for a delayed output of input data. The delay may be variable and may be controlled in terms of numbers of segments by a controller unit (not shown).

A segment frequency offset calculation unit 9 comprises a convolution stage 9a, an error calculation stage 9b and a frequency offset calculation stage 9c. The segment frequency offset calculation unit 9 calculates the measured frequency offset Δf for the actual segment based on results of previous segments.

More specifically, the delayed hard-output values of one segment denoted by the vector $DD_{prev}=DD(n_{1\_prev}, \ldots, n_{2\_prev})$ are fed into the convolution stage 9a. Further, channel coefficients gr estimated by a channel estimator (typically associated with the data decision unit 7) are input into the convolution stage 9a. The convolution stage 9a remodulates the input signal of the data decision unit 7. A data vector $FD_{prev}=FD(n_{1\_prev}, \ldots, n_{2\_prev})$ contains remodulated symbols representing the remodulated signal of one segment.

The error calculation stage 9b receives the remodulated signal FD $(n_{1\_prev}, \ldots, n_{2\_prev})$ and a signal $ZC_{prev}=ZC(n_{1\_prev}, \ldots, n_{2\_prev})$ being the input signal of the data decision unit 7 delayed by another segment delay unit 8. The error calculation stage 9b calculates an error vector e which may be the difference vector between the vector of input signal $ZC(n_{1\_prev}, \ldots, n_{2\_prev})$ and the vector of remodulated signal $FD(n_{1\_prev}, \ldots, n_{2\_prev})$.

The frequency offset calculation stage 9c receives the error vector e and a vector v output by still another segment delay unit 8. The vector v is a vector containing a delayed version $VD_{prev}=VD(n_{1\_prev}, \ldots, n_{2\_prev})$ of a correction signal $VD(n_1, \ldots, n_2)$ used in the filter-and-rotation stage 2 for compensating the filtered input signal $YD(n_1, \ldots, n_2)$ output by a pre-filter 2a within the filter-and-rotation stage 2. The frequency offset Δf of the segment $[n_{1\_prev}, n_{2\_prev}]$ is calculated according to the formula $\Delta f=-e^T v/v^T v$.

The segmented measured frequency offset Δf is input into an integration unit 10. The integration unit 10 outputs a frequency offset correction value $\Delta f_{SEGC}$. $\Delta f_{SEGC}$ is coupled to the filter-and-rotation stage 2 and used for CFO-compensation.

As will be described in more detail later, the integration unit 10 adds the actual frequency offset Δf and a calculated frequency offset correction value $\Delta f_{SEGC}$ which has been used for frequency offset correction of a preceding segment to derive a frequency offset measurement value of the actual segment. This takes into account that the error vector e is based on the already CFO-corrected input symbols $y_{c,n}$ of the data decision unit 7. Further, the integration unit 10 may be operable to comply with different algorithms regarding intra-burst averaging of frequency offset measurement values to calculate a (segment averaged) frequency offset correction value and inter-burst averaging over frequency offset correction values from preceding bursts to calculate an (burst averaged) frequency offset correction value.

Figure 2:
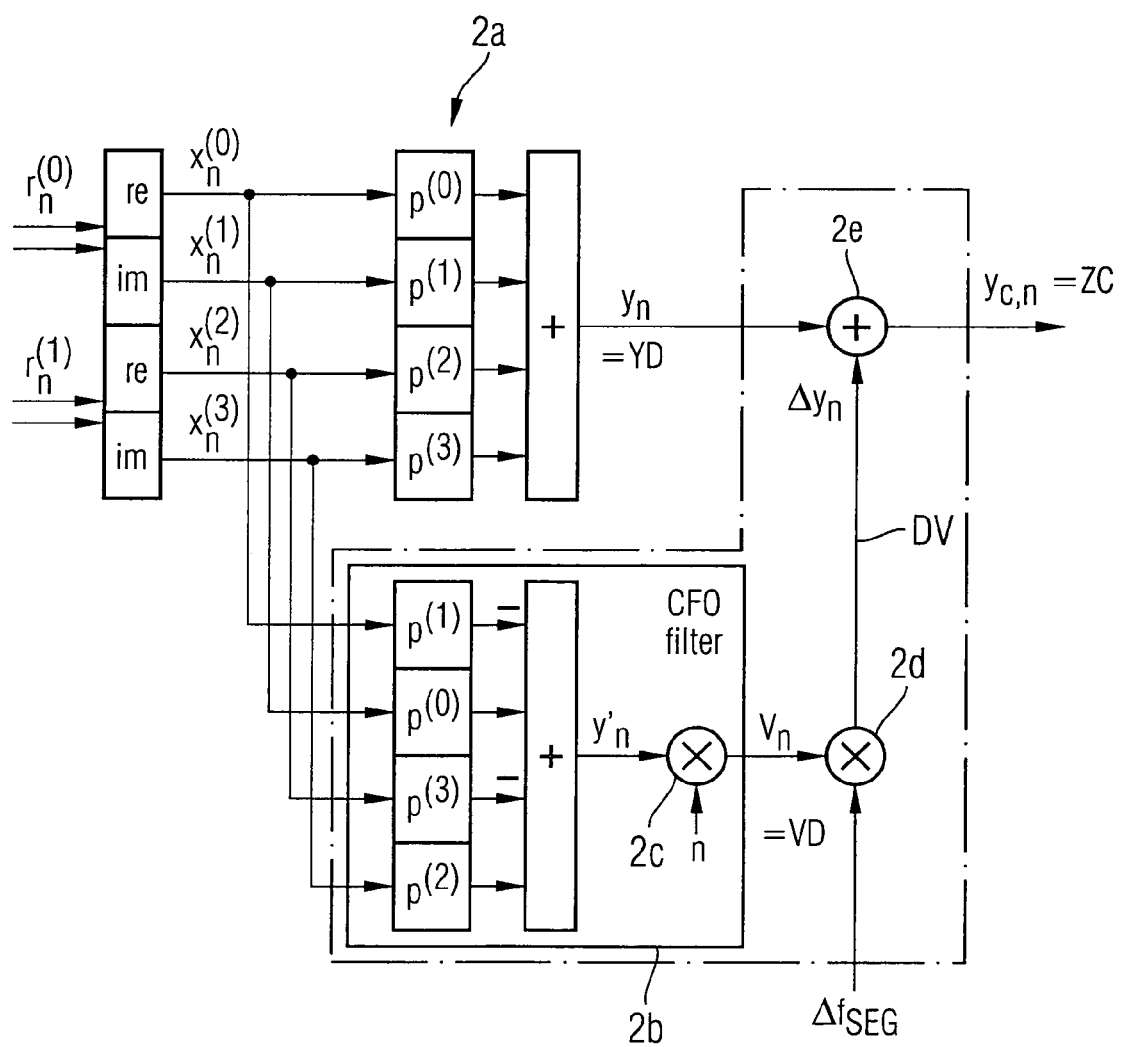
FIG. 2 is a more detailed block diagram of a stage for filtering and correcting CFO depicted in FIG. 1.

The filter-and-rotation stage 2 is described in conjunction with FIG. 2. The filter-and-rotation stage 2 comprises a pre-filter 2a, a CFO-filter 2b, a first multiplier 2c, a second multiplier 2d and an adder 2e.

The pre-filter 2a and the CFO-filter 2b each comprise four multipliers programmed with suitable filter coefficients $p^{(0)}$, $p^{(1)}$, $p^{(2)}$, $p^{(3)}$ and $p^{(0)}$, $-p^{(1)}$, $p^{(2)}$, $-p^{(3)}$, respectively. Each multiplier output is added by a four-input adder. The vector output from the four-input adder of pre-filter 2a is denoted by $YD(n_1, \ldots, n_2)$. The output from the four-input adder of CFO-filter 2b is passed to the first multiplier 2c. The first multiplier 2c multiplies a running index n running over the segment $[n_1, n_2]$ with the output of the adder of CFO-filter 2b. The vector signal at the output of the first multiplier 2c is denoted by $VD(n_1, \ldots, n_2)$.

In the following, the CFO-correction operation of the filter-and-rotation stage 2 is explained. The input signals may be written as $$x_n^{(0,2)}=r_{r,n}^{(0,1)}\cong(S_{r,n}^{(0,1)}+I_{r,n}^{(0,1)}+u_{r,n}^{(0,1)})-(n\Delta_S S_{i,n}^{(0,1)}+n\Delta_f I_{r,n}^{(0,1)})$$

$$x_n^{(1,3)}=r_{i,n}^{(0,1)}r_{i,n}^{(0,1)}\cong(S_{i,n}^{(0,1)}+I_{i,n}^{(0,1)}+u_{i,n}^{(0,1)})+(n\Delta_S S_{r,n}^{(0,1)}+n\Delta_f I_{r,n}^{(0,1)}). \quad (1)$$

($S_n^{(0,1)}$) are the two polyphases of the user signal, ($I_n^{(0,1)}$) are the two polyphases of the interferer signal, $\Delta_S$ is the frequency offset of the user signal and $\Delta_I$ is the frequency offset of the interferer signal. The upper expression in equation (1) relates to the real part as indicated by index r and the lower expression in equation (1) relates to the imaginary part as indicated by index i of the two polyphase input signals $r_n^{(0,1)}$. $u_n^{(0,1)}$ are noise contributions to the input signals $r_n^{(0,1)}$.

It is apparent that a frequency offset $\Delta_S$ of the user signal and/or a frequency offset $\Delta_I$ of the interferer signal mix imaginary part and real part terms, i.e. provides for a signal rotation in the complex plane. Thus, CFO-compensation may be achieved by $$x_{c,n}^{(0,2)} = x_n^{(0,2)} + n\Delta \cdot x_n^{(1,3)}$$

$$x_{c,n}^{(1,3)} = x_n^{(1,3)} - n\Delta \cdot x_n^{(0,2)}, \quad (2)$$

i.e., by derotating the incoming signals (the real part virtual antenna signals $x_n^{(0,2)}$ by the imaginary virtual antenna signals $x_n^{(1,3)}$ scaled by $\Delta$ and vice versa). Disregarding the filter operation, this is what is done in the filter-and-rotation stage 2. In equation (2), $\Delta = \Delta_S$ or $\Delta_I$. The index c means "corrected".

Figure 3:
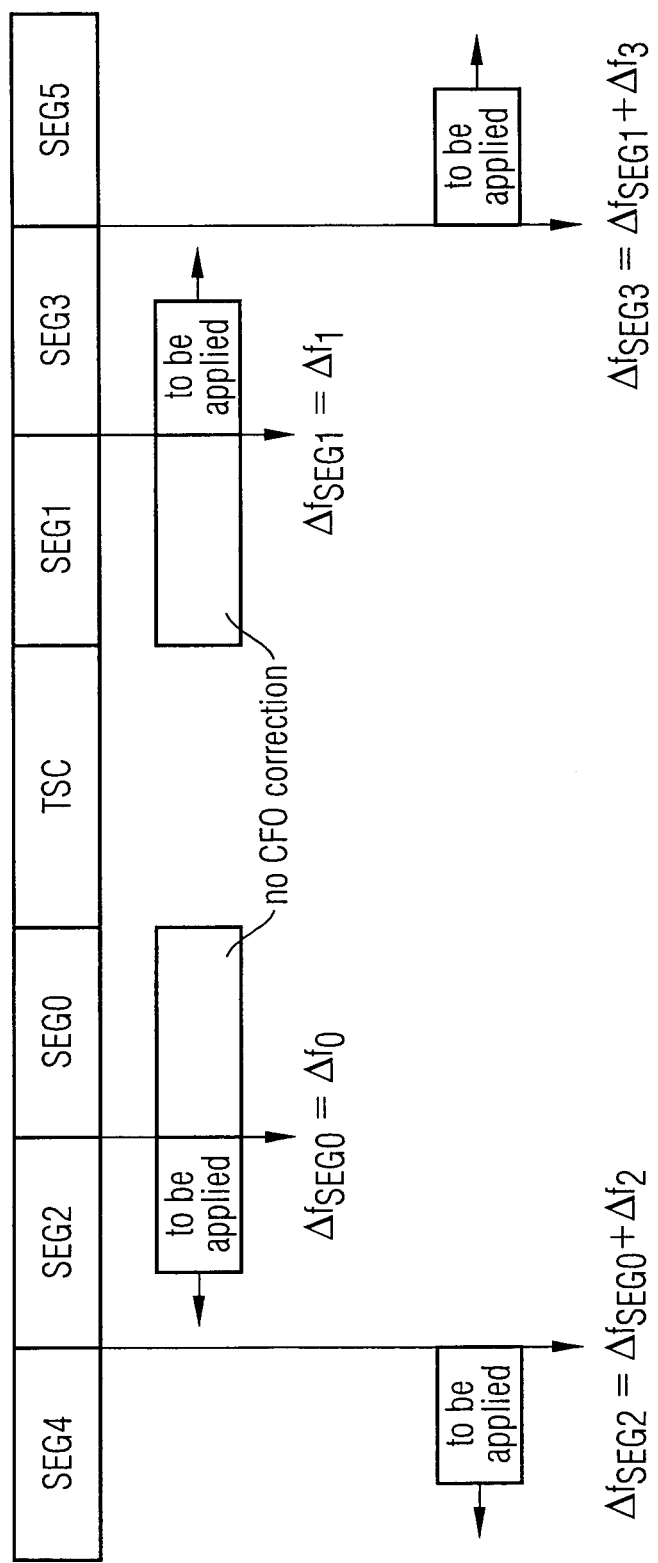
FIG. 3 is a schematic diagram illustrating a first embodiment for processing segmented carrier frequency tracking.

FIG. 3 illustrates an algorithmic approach for CFO-correction according to one embodiment of the invention. A burst is divided into the training-sequence TSC (midamble) and, for instance, six segments SEG0, SEG1, ..., SEG5. In a first step, the frequency offset $\Delta f_0$ of segment SEG0 before CFO-correction is calculated. As during $\Delta f_0$ calculation, the vector $ZC(n_{1\_prev}, \ldots, n_{2\_prev})$ contains not CFO-corrected data, $\Delta f_0$ is the measured frequency offset of segment SEG0. Frequency offset measurement values of segment SEG$i$, $i=1, 2, \ldots$, will be denoted as $\Delta f_{SEGi}$ in the following. Thus, $\Delta f_0 = \Delta f_{SEG0}$. The integration unit 10 simply passes input $\Delta f_0$ to its output. Thus, the frequency offset measurement values $\Delta f_{SEG0}$ is used as a frequency offset correction value to correct the CFO-crosstalk in the next, adjacent segment SEG2. CFO-correction is done by feeding the second multiplier 2d with $\Delta f_{SEG0}$ while processing segment SEG2 in the filter-and-rotation stage 2.

After compensating the frequency offset in segment SEG2, the output vector $ZC(n_1, \ldots, n_2)$ is used to calculate a frequency offset $\Delta f_2$ associated with segment SEG2. Note that the vector $ZC(n_{1\_prev}, \ldots, n_{2\_prev})$ now contains CFO-corrected data. Thus, $\Delta f_2$ is a residual frequency offset rather than a frequency offset measurement value of segment SEG2. In the integration stage 10, the frequency offset correction value which had been applied to segment SEG2 beforehand—namely the $\Delta f_{SEG0}$—is added to residual frequency offset $\Delta f_2$ to yield $\Delta f_{SEG2} = \Delta f_{SEG0} + \Delta f_2$, i.e. the frequency offset measurement value of segment SEG2. This frequency offset measurement value $\Delta f_{SEG2}$ of segment SEG2 is applied for correction of the next, adjacent segment SEG4, i.e. is used as frequency offset correction value for segment SEG4.

Segments SEG1, SEG3, SEG5 in the right hand part of the burst are processed similarly. No CFO-correction is applied to the data of SEG1. The segment frequency offset correction value applied to segment SEG3 is $\Delta f_1$, i.e. the frequency offset evaluated in the segment SEG1 before CFO-correction (being the frequency offset measurement value of segment SEG1). Contrary to this, the frequency offsets $\Delta f_3, \Delta f_5, \ldots$ are residual frequency offsets evaluated in the segments SEG3, SEG5, ... after CFO-correction and are thus added to previously applied segment frequency offset correction values, here being given by the frequency offset measurement values $\Delta f_{SEG1}, \Delta f_{SEG3}, \ldots$. This scheme provides for a successive application of previously obtained segment measurement values for CFO-correction of an actual segment.

Figure 4:
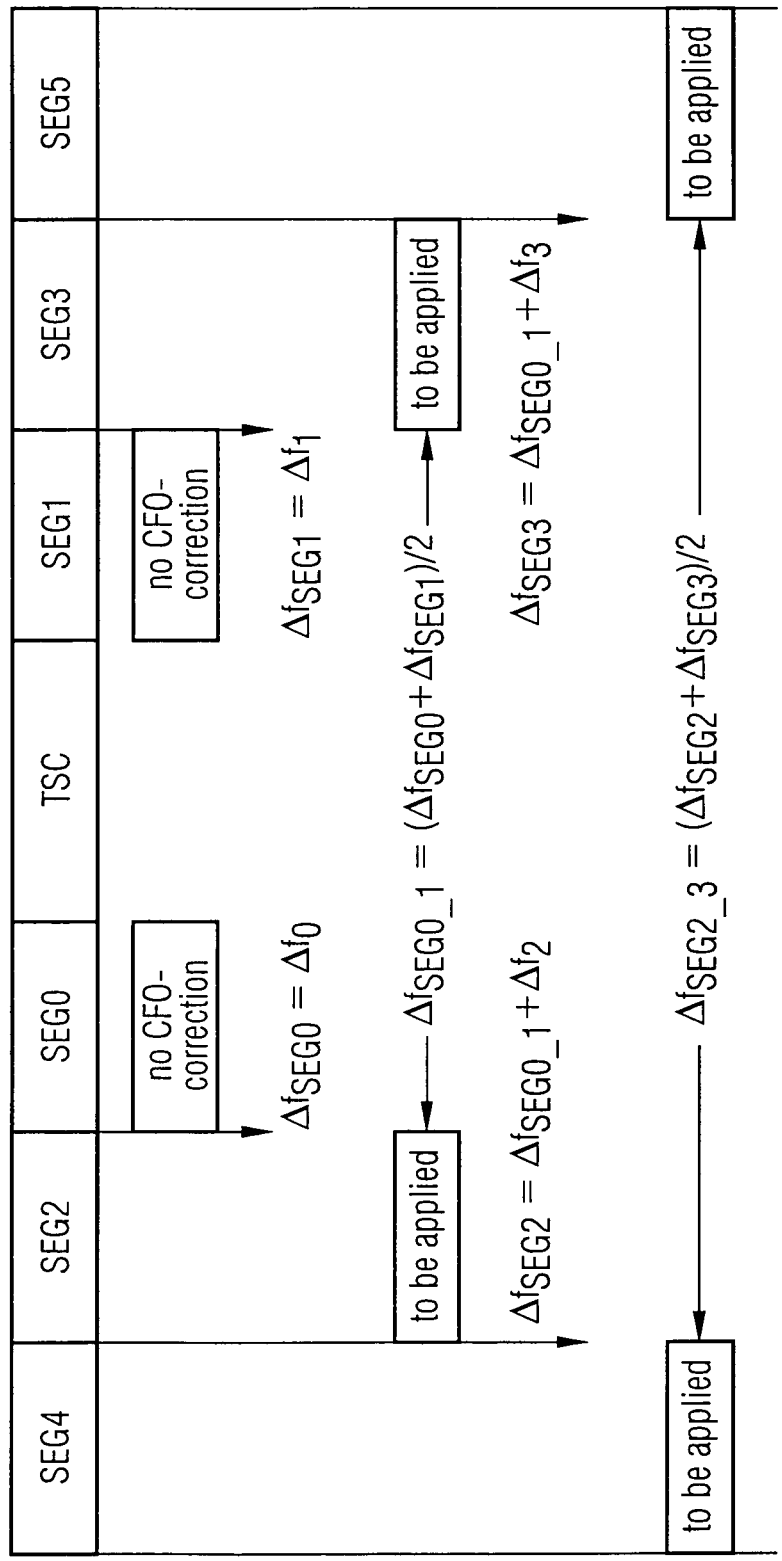
FIG. 4 is a schematic diagram illustrating a second embodiment for processing segmented carrier frequency tracking.

FIG. 4 illustrates a further embodiment for carrier frequency tracking. This embodiment uses an algorithmic approach for intra-burst averaging. Again, in this scheme, the innermost segments SEG0 and SEG1 are not CFO-compensated but only used to calculate the offset values $\Delta f_0, \Delta f_1$. These values are the frequency offset measurement values $\Delta f_{SEG0}, \Delta f_{SEG1}$ of segments SEG0, SEG1, respectively. However, in contrast to FIG. 3, the frequency offset measurement values are averaged according to $\Delta f_{SEG0\_1} = (\Delta f_{SEG0} + \Delta f_{SEG1})/2$ instead of being directly used for CFO-correction. This (averaged) frequency offset correction value $\Delta f_{SEG0\_1}$ is applied for CFO-correction to the next segments SEG2 and SEG3.

Again, the frequency offsets evaluated in the segments SEG2 and SEG3 after CFO-correction are denoted by $\Delta f_2$, $\Delta f_3$, respectively. These frequency offsets, together with the frequency offset correction value $\Delta f_{SEG0\_1}$ applied beforehand to segments SEG2, SEG3, are used to calculate the frequency offset measurement values of segments SEG2 and SEG3, namely $\Delta f_{SEG2} = \Delta f_{SEG0\_1} + \Delta f_2$ and $\Delta f_{SEG3} = \Delta f_{SEG0\_1} + \Delta f_3$, respectively. In contrast to FIG. 3, rather than applying $\Delta f_{SEG2}$ and $\Delta f_{SEG3}$ to segments SEG4, SEG5, respectively, an intra-burst averaged segment frequency offset correction value $\Delta f_{SEG2\_3} = (\Delta f_{SEG2} + \Delta f_{SEG3})/2$ is calculated and applied to both the segments SEG4 and SEG5.

The statistical quality of intra-burst averaging in the scheme illustrated in FIG. 4 is improved over the scheme illustrated in FIG. 3, because the (averaged) frequency offset correction values applied to segments SEG2, ..., SEG5 are taking into account complementary segments of the left and right half-bursts.

Figure 5:
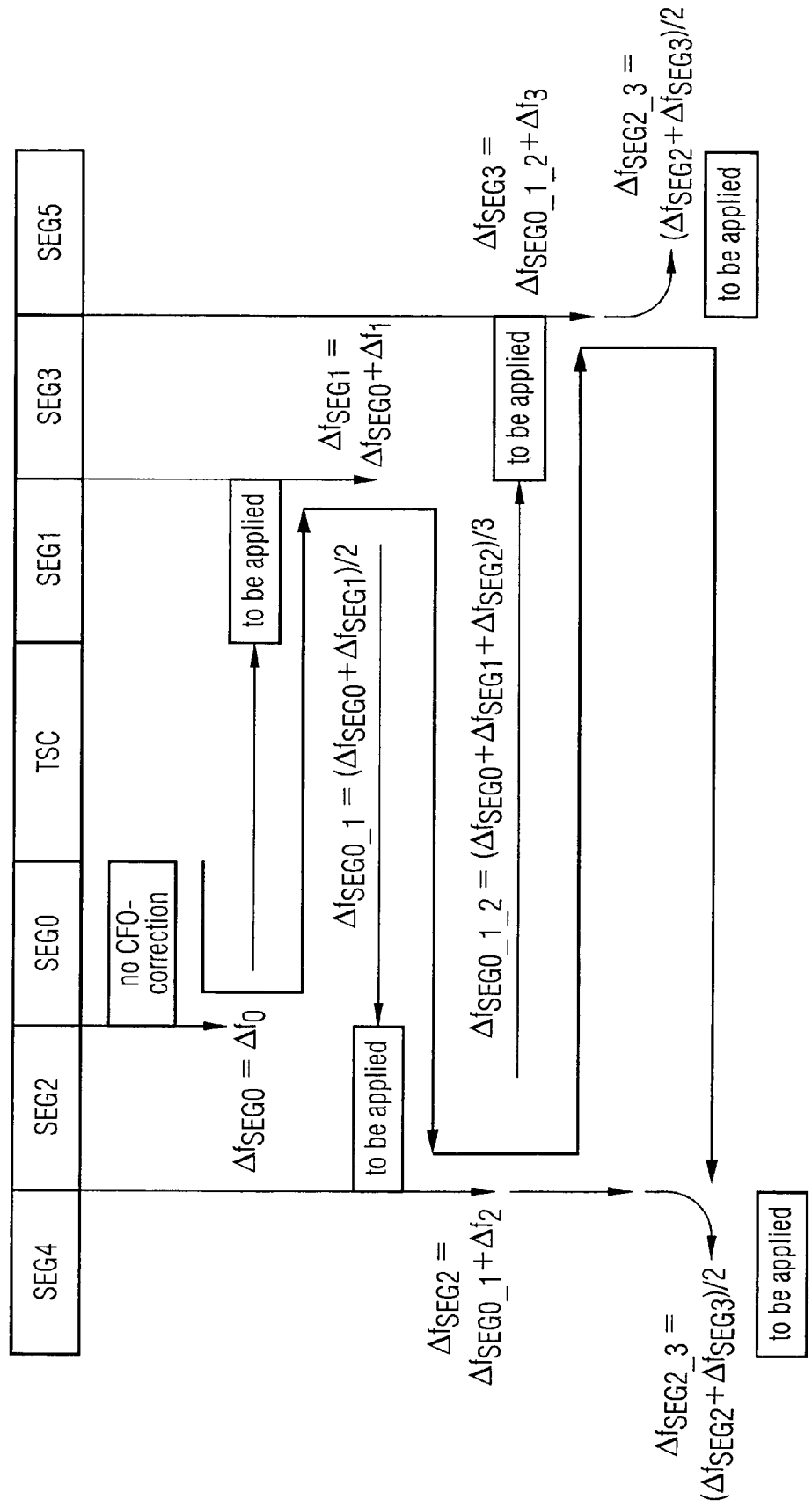
FIG. 5 is a schematic diagram illustrating a third embodiment for processing segmented carrier frequency tracking.

FIG. 5 illustrates a third embodiment for carrier frequency tracking, also using segmented intra-burst averaging. Frequency offset $\Delta f_0$ is calculated as described in conjunction with FIGS. 3 and 4. The frequency offset measurement value $\Delta f_{SEG0} = \Delta f_0$ is applied as frequency offset correction value for CFO-correction of segment SEG1 in the opposite half-burst. The residual frequency offset $\Delta f_1$ is evaluated in segment SEG1 after CFO-correction. Instead of applying $\Delta f_{SEG1} = \Delta f_{SEG0} + \Delta f_1$ for CFO-correction of the next segment, $\Delta f_{SEG0\_1} = (\Delta f_{SEG0} + \Delta f_{SEG1})/2$ is used for CFO-correction in segment SEG2 being the next segment in the opposite half-burst. Then, the residual frequency offset $\Delta f_2$ evaluated in segment SEG2 after CFO-correction is used to calculate the frequency offset measurement value of segment SEG2, namely $\Delta f_{SEG2} = \Delta f_{SEG0\_1} + \Delta f_2$. All available frequency offset measurement values up to this time are used to calculate $\Delta f_{SEG0\_1\_2} = (\Delta f_{SEG0} + \Delta f_{SEG1} + \Delta f_{SEG2})/3$. $\Delta f_{SEG0\_1\_2}$ is the (averaged) frequency offset correction value to be applied for CFO-correction of segment SEG3. This procedure may be continued until each segment in the burst is CFO-compensated. Or, according to FIG. 5, the last two segments SEG4, SEG5 are corrected by a common segment frequency correction value $\Delta f_{SEG2\_3} = (\Delta f_{SEG2} + \Delta f_{SEG3})/2$ being the mean value of the previously obtained frequency offset measurement values $\Delta f_{SEG2}, \Delta f_{SEG3}$, where $\Delta f_{SEG3} = \Delta f_{SEG0\_1\_2} + \Delta f_3$. Thus, in FIG. 5, a segment frequency offset correction value applied for CFO-correction may be built as an average value of all or a part of the available segment frequency offset measurement values based on previously processed segments.

It is to be noted that the receiver structure illustrated in FIG. 1 in one embodiment may be controllable in a flexible manner to provide for different intra-burst averaging schemes as, for instance, described above. The scheduler 3 may be configured to schedule segments of the burst in a variable order. In one embodiment, the segment delay units 8 may be controllable and may provide for variable segmented delays. Further, the integration unit 10 may be operable to process different integration procedures conforming with the intra-burst averaging scheme to be used.

Above, intra-burst averaging over segments of the actual burst is considered. Intra-burst averaging over one burst provides for a highly adaptive CFO-correction process because carrier frequency error information from preceding bursts is disregarded. However, there may be situations in which a smoother burst-by-burst migration to different frequency offset values is desirable. Further, it may be desirable that an actually calculated frequency offset correction value, on a burst-by-burst scale, has to be protected against single measured carrier frequency offset values not lying within a region of confidence. For instance, these two aspects have to be considered in a situation where a first interferer with a first frequency offset is present and after some time, a second interferer with a different frequency offset will become dominant.

Averaging of calculated CFO-correction values over several bursts may be accomplished by an IIR-filter with a forgetting factor of "delta_alpha". Further, another IIR-filter with a forgetting factor of "alpha_var" may be used to calculate a simplified expression of the standard deviation of CFO-correction values obtained over several bursts.

In the following, an example for implementing these two IIR-filters in C-code according to one embodiment is set out:

```
delta_alpha = 0.0625;
alpha_var = 0.0625;
Example for segment 0:
delta_var[0] = (1.0-alpha_var)*delta_var[0]+
alpha_var*fabs(delta-delta_state[0]);
if (fabs(delta_state[0]-delta)<delta_var[0])
{
delta_state[0]=(1.0-delta_alpha)*delta_state[0]+delta_alpha*delta;
}
delta = (delta_state[0]+delta_state[1])/2.0;
```

In this embodiment, the variable "delta" corresponds to the segment frequency offset measurement value $\Delta f_{SEG0}$ of the considered segment SEG0, i.e. delta=$\Delta f_{SEG0}$. "delta_state[0]" is a state variable for segment frequency offset correction values averaged over several bursts. "delta_var[0]" is the calculated standard deviation of measured frequency offset values for segment SEG0. fabs(•) is the (floating point) absolute value of the term put in brackets.

Briefly, the delta (in the above example referring to segment SEG0) is measured for each burst as described above. Then, the variables delta_var[0] and delta_state[0] are updated according to the above code expressions. delta_state[0] is only updated if delta (i.e. the actual segment frequency offset measurement value $\Delta f_{SEG0}$) minus delta_state[0] for the previous burst is smaller than delta_var[0], i.e. falls within a confidence interval. In case of a sudden change of the measurement values delta from one burst to the next burst, this protects the state variable delta_state[0] from instantaneously moving in direction to the new frequency offset measurement value delta, i.e. from jittering. On the other hand, if the frequency offset measurement value delta is permanently displaced, the confidence interval defined by delta_var[0] broadens and will reach the new measurement value delta after some bursts, provided the dislocated value delta remains sufficiently stable.

The last line of the code relates to intra-burst averaging as explained before, however, now applied to state variables, i.e. to inter-burst averaged quantities. The code example set out above can be analogously used to update correspondingly defined variance and state variables delta_var[i], delta_state[i] for other segments SEGi, i=1, 2, . . . . Further, the filter characteristics can be varied by choosing different values for the forgetting factor delta_alpha and the forgetting factor alpha_var. Programming different values for different situations may enhance the CFO-tracking performance of the receiver. Further, intra-burst averaging (last code line) may be applied in accordance with any of the schemes mentioned above or other schemes.

Figure 6:
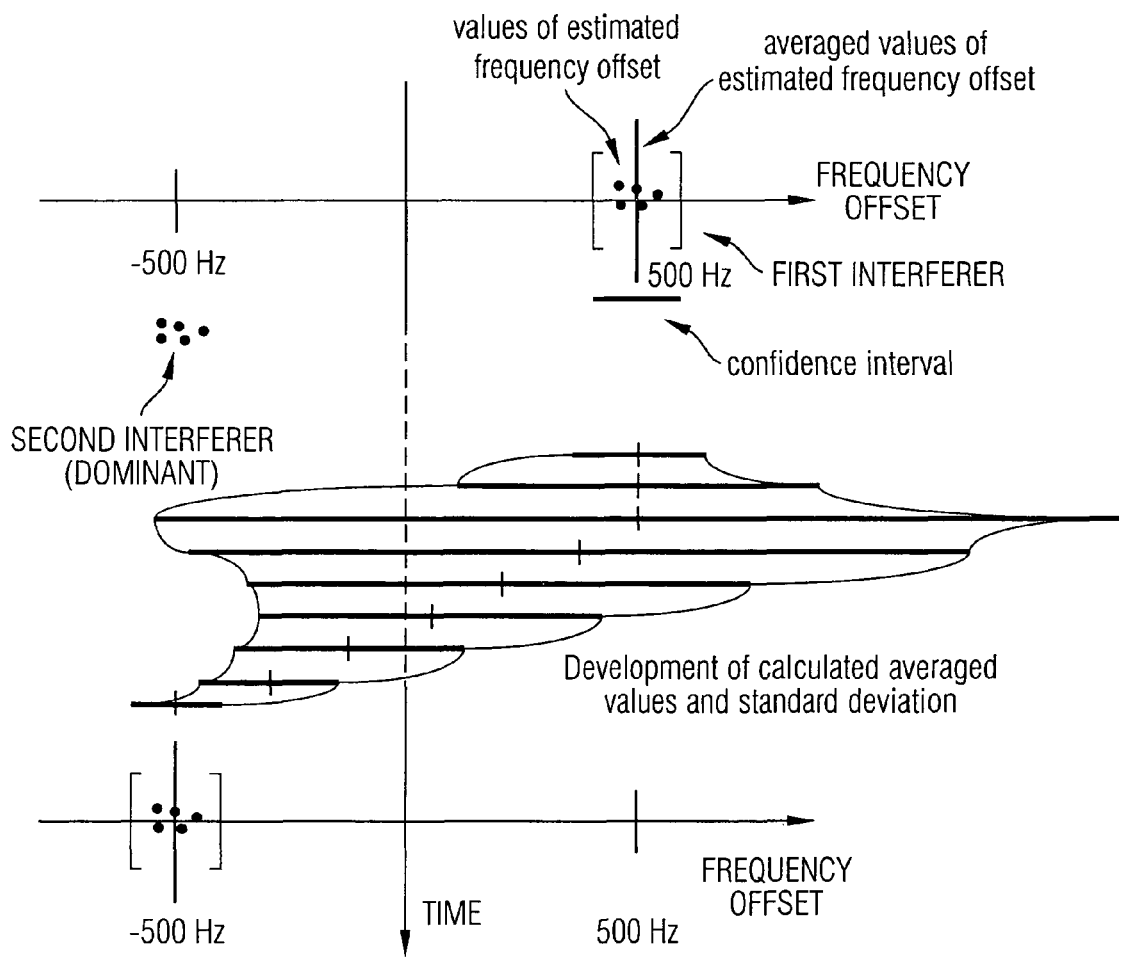
FIG. 6 is a schematic diagram illustrating the transition of the estimated frequency offset in a scenario where an interferer having a carrier frequency offset is dominated by another interferer having a different carrier frequency offset.

In FIG. 6, at the beginning, a first interferer is apparent at a frequency offset $\Delta_f$=500 Hz. The confidence interval defined by delta_var is small. After some time, another interferer becomes dominant at a frequency offset of −500 Hz. At this time, the new measurement values are beyond the confidence interval. Therefore, for some bursts, the now erroneously averaged old frequency offset correction value delta_state[i] is maintained for all segments SEGi. The newly measured frequency offset values delta are inhibited from admittance to the averaging process. This causes a kind of hysteresis. However, the variance (expressed by delta_var) is calculated the same way as before taking into account the newly measured values of delta. Therefore, the variance smoothly increases until the newly measured frequency offset value delta falls into the region of confidence. Some bursts later, when the newly measured delta values have been confirmed, the burst-averaged segment frequency offset correction value (expressed by state variable delta_state[i]) slowly migrates to the new measurement values delta, as illustrated in FIG. 6.

This delay in reaction is beneficial as in practice, a cluster of interferers is often present in addition to a user's own frequency offset. Additionally, the change from dominant to non-dominant interferers take place within an interval of several bursts. As already mentioned, the reaction time as well as the migration rate can be adjusted by the forgetting factors delta_alpha and alpha_var and may, for instance, be chosen to be dependent on the receiver's velocity.

In the above example, the variance delta_var[i] is calculated and updated for each segment SEGi, i=0, 1, . . . . It is also possible to use a mean variance value which may be derived for instance by averaging the segmented variance values delta_var[i] over the entire burst. In this case, the confidence interval depicted in FIG. 6 is associated to the entire burst rather than to a specific segment of the burst.

Further, updating of the inter-burst averaged segment frequency offset correction value delta_state[i] may also be accomplished by using a single averaged frequency offset correction value from the preceding burst, which may be derived by averaging the segment frequency offset correction values delta_state[i] of the preceding burst over the segments and then applying this segment averaged frequency offset correction value for updating the segment frequency offset correction values delta_state[i] of the actual burst.

Figure 7:
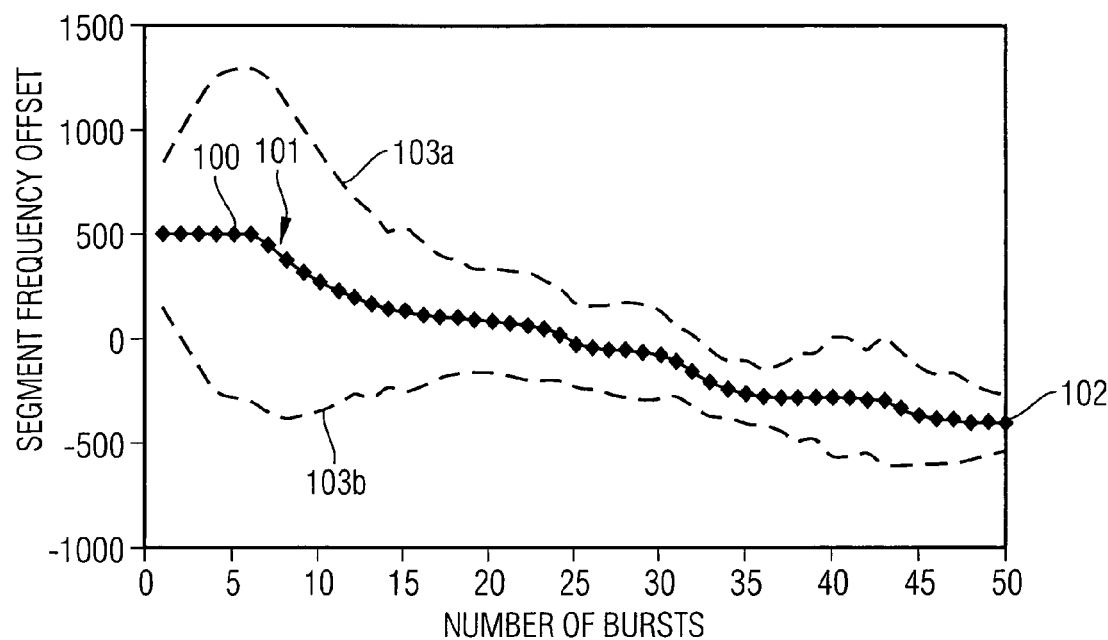
FIG. 7 is a graph illustrating the estimated interferer frequency offset versus the number of bursts for the scenario of FIG. 6.

FIG. 7 shows the development of updated segment frequency offset correction values using inter-burst averaging and the development of the lower and upper bounds of the confidence interval over the number of bursts. The situation is the same as in FIG. 6. At the start time (zero number of bursts), a first interferer at a frequency offset of 500 Hz is replaced by a second interferer of a frequency offset of −500 Hz. Over the first few bursts, the segment frequency offset correction values 100 remain stable whereas the confidence interval 103a, 103b rapidly grows. At the time the growing confidence interval "captures" the segment frequency offset correction values around −500 Hz, the averaged segment frequency offset correction values move into the direction of the second interferer's frequency offset causing the confidence interval to diminish. The total reaction time until the segment frequency offset correction values reach the second interferer frequency offset of −500 Hz at 102 may be in the region of several tens of bursts.

Figure 8:
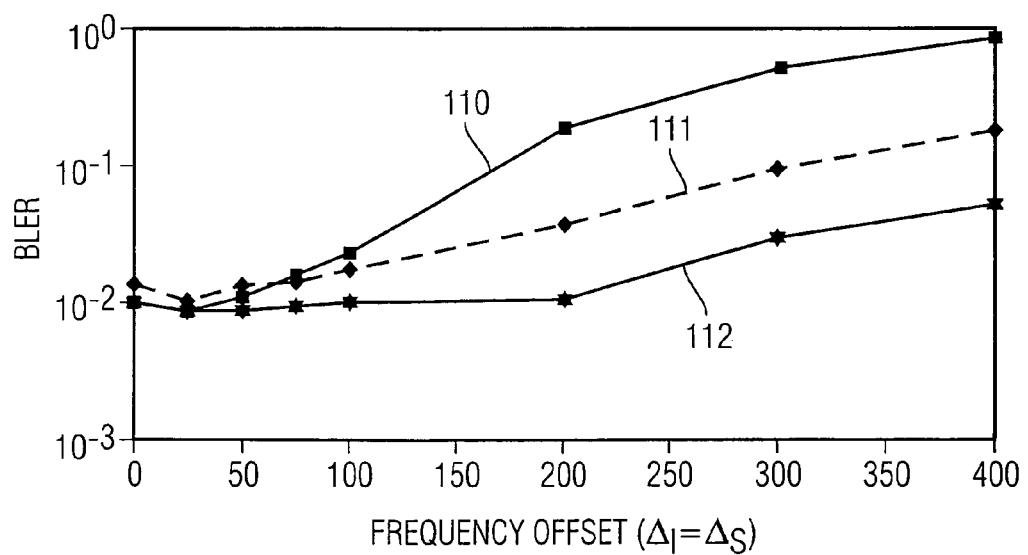
FIG. 8 is a graph illustrating the block error rate versus the applied frequency offset.

FIG. 8 illustrates the effect of inter-burst averaging on the signal quality expressed in terms of BLER (block error ratio). In this figure, simulation results with applied frequency offsets ranging from 0 to 500 Hz are shown. In this test case, the frequency offset is on both the user and the interferer signal and has the same value. For frequency offset values greater than 60 Hz, the signal quality is worst when CFO-correction is deactivated (line 110), improves, when CFO-correction is active with intra-burst averaging but without inter-burst averaging of frequency offset results (line 111) and is best when CFO-correction is active with inter-burst averaging and with intra-burst averaging (line 112). For user and interferer signal frequency offset values below 60 Hz, the CFO-compensated but not inter-burst averaged results on line 111 are worse than the not CFO-compensated results on line 110.

Figure 9:
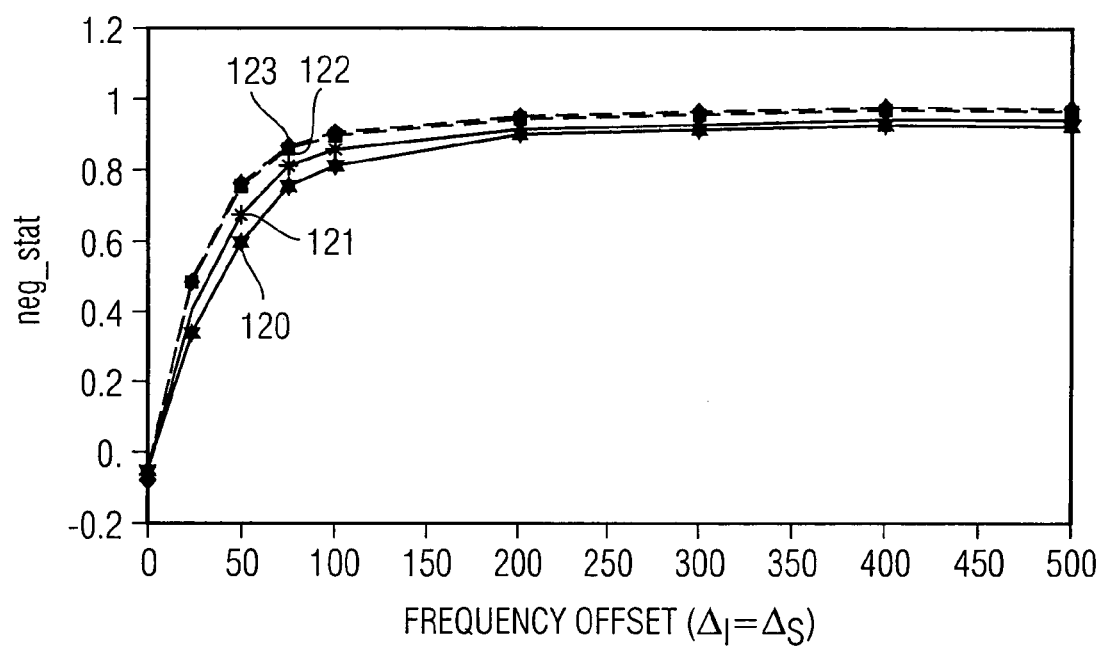
FIG. 9 is a graph illustrating a quantity indicative of a statistical reliability of the calculated carrier frequency offset versus the applied frequency offset.
Figure 10:
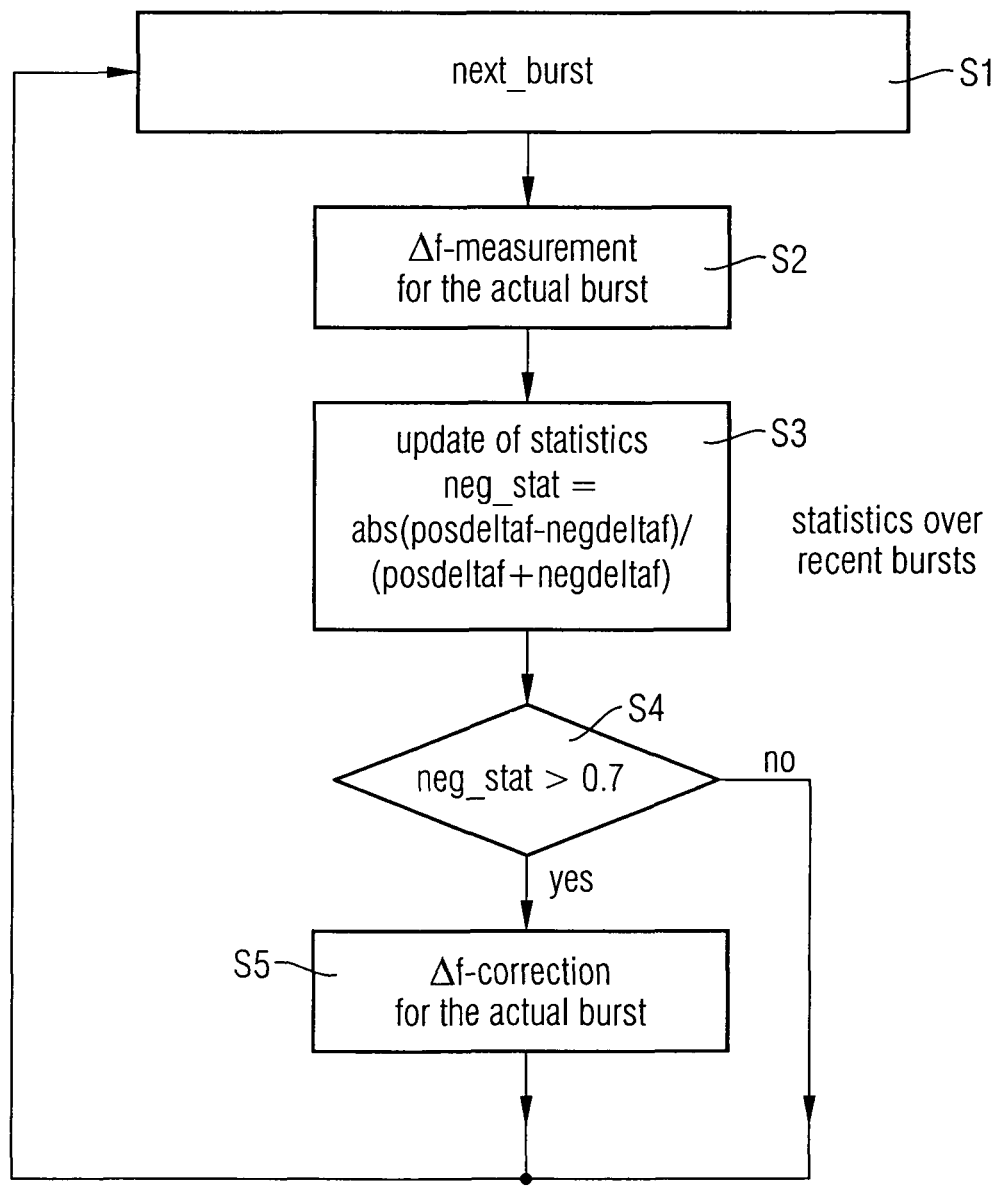
FIG. 10 is a flow chart illustrating a procedure for deciding on activation or deactivation of CFO correction based on the statistics of frequency offset calculation.

FIG. 9 shows the reason for this behavior. As in FIG. 8, the user signal and the interferer signal are assumed to have both a frequency offset of the same value. A statistical quantity "neg_stat" for instance given by neg_stat=abs(posdeltaf−negdeltaf)/(posdeltaf+negdeltaf) may be used to evaluate the statistics of CFO-calculation in view of reliability. In this equation, posdeltaf is the number of positive segment frequency offset measurement values obtained for the segments over some recent bursts. negdeltaf is the number of negative segment frequency offset measurement values obtained for the segments over some recent bursts. The higher the number of negative segment frequency offset measurement values calculated in the past (assuming a positive frequency offset has been established), the lower is the statistical reliability and thus the lower is neg_stat. Apparently, the probability to obtain negative segment frequency offset measurement values increases for small frequency offsets applied. The occurrence of these negative segment frequency offset measurement values makes the CFO-compensation performance worse than without compensation, cf. FIG. 8. This is confirmed for SEG0 (line 120), SEG1 (line 121), SEG2 (line 122), SEG3 (line 123).

neg_stat is above an empirical value of 0.7 to 0.8 until reliable segmented CFO-measurements can be assumed. From FIG. 9, it appears that the value of 0.7 is achieved only for applied frequency offsets greater than 60 Hz. Therefore, for frequency offsets less than 60 Hz, either no CFO-compensation (line 110) or a CFO-compensation in combination with averaging over several bursts (inter-burst averaging, line 112) is preferred in this case. FIG. 10 illustrates a flow chart for performing CFO-compensation in case of statistically unreliable results in accordance with one embodiment of the invention. In step S1, a next burst is considered. In step S2, segment frequency offset measurement and/or correction values are calculated according to one of the schemes outlined before (optionally employing inter-burst averaging to improve the statistics). In step S3, the statistical quantity neg_stat is calculated over some recent bursts. The number of recent bursts used for calculation of neg_stat should be chosen such that neg_stat itself has sufficient reliability.

In step S4, calculated neg_stat is compared with the empirical value, for instance 0.7. If neg_stat>0.7, the statistical reliability is good. In this case, CFO-compensation for the actual burst is accomplished (step S5). Otherwise, if neg_stat≤0.7, the statistical reliability is not sufficient. In this case, no CFO-compensation is done for the actual burst and the process returns to step S1 for processing the next burst.

As explained above, the functionality of inhibition of CFO-compensation depending on an evaluation of the statistical reliability of calculated segment frequency offset measurement values improves the system performance specifically in the case of small carrier frequency offsets of a user and/or an interferer signal.

Figure 11:
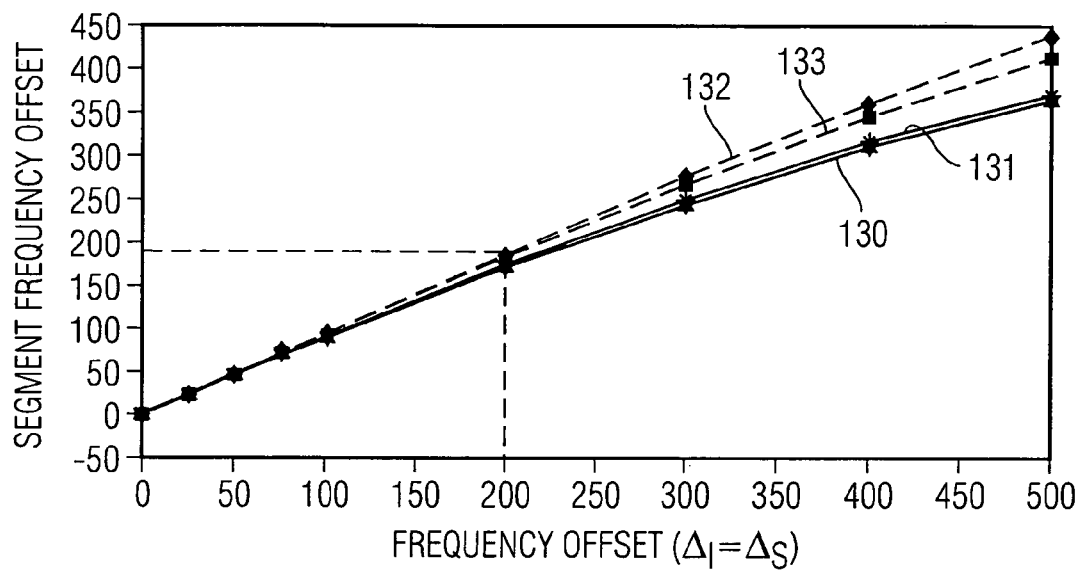
FIG. 11 is a graph illustrating the estimated frequency offset versus the applied frequency offset for different segments within bursts, where a frequency offset is on the user signal and on the interferer signal.
Figure 12:
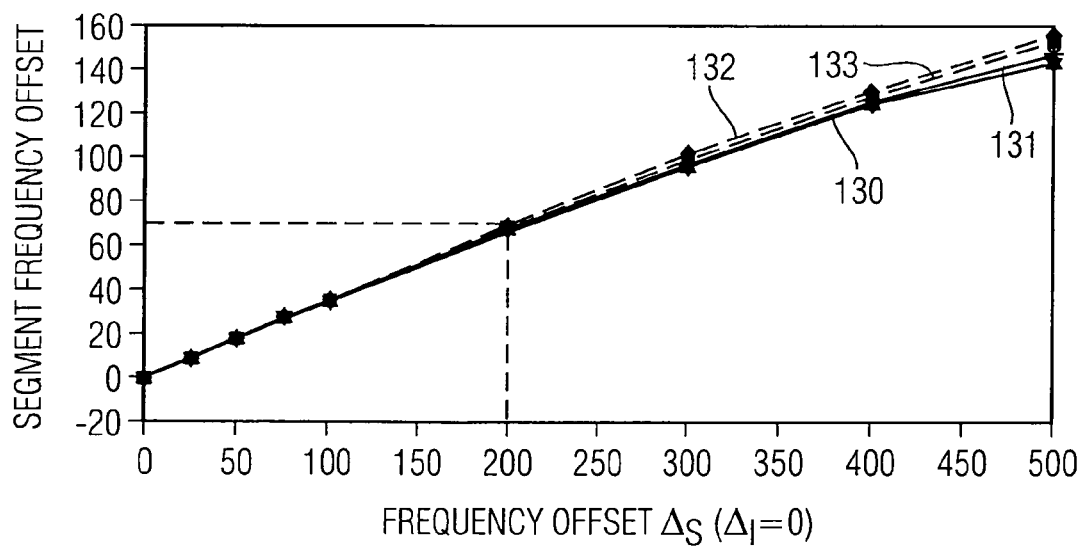
FIG. 12 is a graph illustrating the estimated frequency offset versus the applied frequency offset for different segments within bursts, where a frequency offset is only on the user signal.

A further effect encountered when applying a segmented CFO-compensation scheme is illustrated in FIGS. 11 and 12. FIGS. 11 and 12 show simulation results in which the calculated segment frequency offset correction value versus the frequency offset applied for the simulation is shown. FIG. 11 corresponds to the same situation as FIGS. 7 and 8, i.e. to the case that the user signal and the interferer signal each have a frequency offset of identical value. FIG. 12 corresponds to the case in which a frequency offset is only present on the user signal, i.e. $\Delta_I$=0.

In the ideal case, i.e. perfect CFO-compensation, the segment frequency offset correction value used for segmented frequency offset correction should be calculated to be identical to the applied test case frequency offset $\Delta_I$ and/or $\Delta_S$. While this is nearly the case in FIG. 11, where a user signal and an interferer signal with a frequency offset are used, the 1:1 relationship between applied frequency offset value and calculated frequency offset correction value is not confirmed in FIG. 12, where a frequency offset is applied only to the user signal. In this case, the calculated segment frequency offset correction values are significantly smaller than the applied user frequency offset $\Delta_S$. This behavior is shown for SEG0 (line 130), SEG1 (line 131), SEG2 (line 132) and SEG3 (line 133). It can be shown that the characteristic illustrated in FIG. 12 also applies to the case where only the interferer signal has a frequency offset different from zero ($\Delta_I \neq 0$) and the user signal frequency offset is zero ($\Delta_S$=0). Thus, the precision of the calculation results of the frequency offset correction values depends on whether the frequency offset is due to the user or interferer signal alone or to both of these signals.

The behavior of the simulation results in FIG. 12 can be understood from a rough estimation of measured frequency offsets $\Delta f_{measured}^{(0)}$, $\Delta f_{measured}^{(1)}$. Assuming the frequency offset is only applied to the user $\Delta f_{measured}^{(0,1)}$ is proportional to $$-\Delta_s(p^{(0,2)}S_{i,n}^{(0,1)}-p^{(1,3)}S_{r,n}^{(0,1)})/[p^{(0,2)}(S_{i,n}^{(0,1)}+I_{i,n}^{(0,1)})-p^{(1,3)}(S_{r,n}^{(0,1)}+I_{r,n}^{(0,1)})]. \quad (3)$$

The estimation of the measured frequency offset in the case where the frequency offset is only applied to the interferer (i.e. $\Delta_I \neq 0$, $\Delta_S$=0) is analogous.

From equation (3), it is obvious that the measured frequency offset is scaled by CIR (Carrier-to-Interference Ratio) and by the interferer-suppression of the pre-filter 2a.

Figure 13:
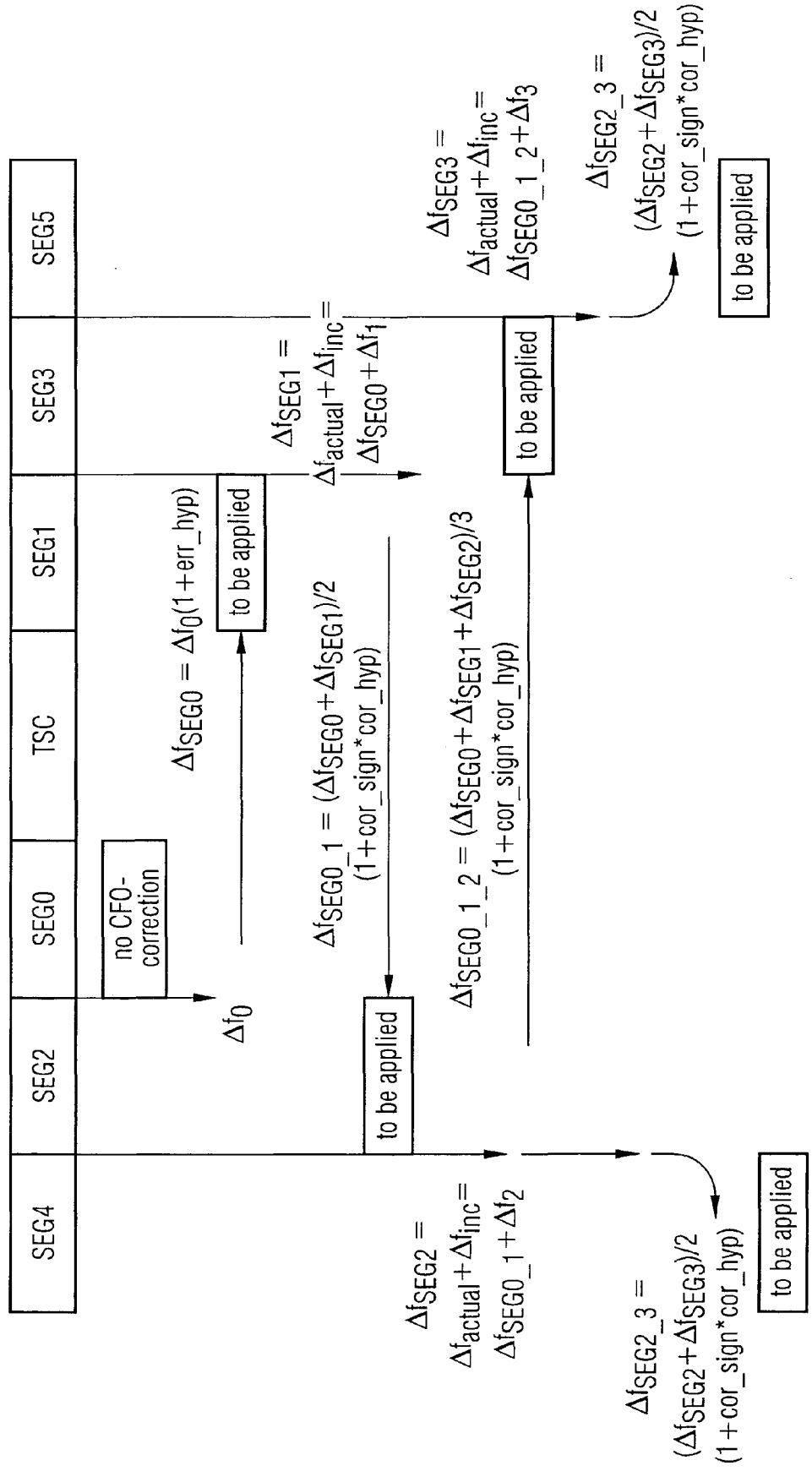
FIG. 13 is a schematic diagram illustrating a fourth embodiment for processing segmented carrier frequency tracking.

In consequence, the segment frequency offset correction value is calculated too low in the case of a frequency offset only for the user or only for the interferer. In order to compensate this error, an error hypothesis assuming for instance that the frequency offset is calculated 20% too low (or any other suitable value) may be introduced. A segment frequency offset calculation scheme employing the error hypothesis approach is shown in FIG. 13 according to one embodiment. This scheme is based on the segment carrier frequency offset calculation scheme shown in FIG. 5, i.e. all or apart of the calculated segment frequency offset measurement values $\Delta f_{SEGi}$ are averaged for calculating the segment frequency offset correction value to be applied for the next segment SEGi+1.

More specifically, in FIG. 13, the following segment frequency offset correction values are used for CFO-correction: $\Delta f_{SEG0}$ is applied to segment SEG1, $\Delta f_{SEG0\_1}$ is applied to segment SEG2, $\Delta f_{SEG0\_1\_2}$ is applied to segment SEG3 and $\Delta f_{SEG2\_3}$ is applied to both segments SEG4 and SEG5. These segment frequency offset correction values are calculated according to the following expressions in one embodiment:

$$\Delta f_{SEG0}=\Delta f_0(1+\text{err\_hyp}) \quad (4)$$

$$\Delta f_{SEG0\_1}=(\Delta f_{SEG0}+\Delta f_{SEG1})/2(1+\text{cor\_sign}\cdot\text{cor\_hyp}) \quad (5)$$

$$\Delta f_{SEG0\_1\_2}=(\Delta f_{SEG0}+\Delta f_{SEG1}+\Delta f_{SEG2})/3(1+\text{cor\_sign}\cdot\text{cor\_hyp}) \quad (6)$$

$$\Delta f_{SEG2\_3}=(\Delta f_{SEG2}+\Delta f_{SEG3})/2(1+\text{cor\_sign}\cdot\text{cor\_hyp}). \quad (7)$$

According to the above equations, the error hypothesis associated with the correction term err_hyp is first introduced for calculation of the segment frequency offset correction value for the first segment SEG1. The segmented measurements of the residual frequency offsets $\Delta f_i$ may be used to check whether the error hypothesis is right or wrong. This is done by introducing the variables $\Delta f_{actual}$ for the segment frequency offset correction value and $\Delta f_{inc}$ for the residual frequency offset. Thus, after frequency error correction and frequency error measurement of segment SEG1, these variables are set to $\Delta f_{actual}=\Delta f_{SEG0}$ and $\Delta f_{inc}=\Delta f_1$.

Then, the value −1 or 1 of a variable cor_sign is determined according to the following scheme in one embodiment:

```
if ((sign(Δf_inc)==1)&&(sign(Δ_actual)==0))
   cor_sign = −1;
else if ((sign(Δf_inc)==0)&&(sign(Δf_actual)==1))
   cor_sign = 1;
      (8)
else if ((sign(Δf_inc)==0)&&(sign(Δf_actual)==0))
   cor_sign = 1;
else
   cor_sign = −1.
```

Here, sign==1 corresponds to a negative sign and sign==0 corresponds to a positive sign. Depending on the sign of the segment frequency offset correction value $\Delta f_{SEG0}$ actually applied to segment SEG1 and on the sign of the measured frequency offset $\Delta f_1$ of segment SEG1, a wrong error hypothesis is corrected or the error hypothesis is confirmed and increased segment by segment by virtue of cor_hyp. During the processing of segment SEG2, the segment frequency offset is corrected by applying the segment frequency offset correction value $\Delta f_{SEG0\_1}$ and the residual frequency offset $\Delta f_2$ is measured. Now, the variables $\Delta f_{actual}$ and $\Delta f_{inc}$ are set to $\Delta f_{actual}=\Delta f_{SEG0\_1}$ and $\Delta f_{inc}=\Delta f_2$. Again, cor_sign is calculated according to equation (8). Then, inserting cor_sign into equation (6), $\Delta f_{SEG0\_1\_2}$ is calculated and applied for frequency offset correction of segment SEG3.

In a last step, the variables $\Delta f_{actual}$ and $\Delta f_{inc}$ are set to $\Delta f_{actual}=\Delta f_{SEG0\_1\_2}$ and $\Delta f_{inc}=\Delta f_3$. cor_sign is calculated and the segment frequency offset correction value $\Delta f_{SEG2\_3}$ is determined and applied to segments SEG4 and SEG5 for CFO-correction. As an example, err_hyp=0.2 and corr_hyp=0.05 may be used.

This scheme to correct a potentially wrong error hypothesis is beneficial because in reality, it can not be determined whether the frequency offset is due to user signals, interferer signals or to both with different offset values. Further, the value of the CIR is not known, which scales the measured frequency offset values, cf. equation (3). Moreover, the above scheme takes into account other unknown quantities affecting the measured frequency offset values, namely, inter alia, the number of interferers distorting the user signals and the effectiveness of interferer suppression.

A procedure for incorporation of an error hypothesis can be written in one embodiment as $$\Delta f_{SEG0\ldots}=\Delta f_{0\ldots}+\Delta f_0\cdot\text{err\_hyp}$$

$$\Delta f_{SEG\ldots}=(\Delta f_{SEG\ldots}+)+\text{cor\_sign}\cdot(\Delta f_{SEG\ldots}+)\cdot\text{cor\_hyp}. \quad (9)$$

This procedure may be expanded by the utilization of averaged quantities (over several bursts) for the segment frequency offset correction values and/or not-averaged quantities for the segment frequency offset correction values (e.g. burst-by-burst). More specifically, it is possible to use averaged or not-averaged quantities for the originally applied frequency offset correction values for the actual segment and averaged or not-averaged quantities of the frequency offset correction values to be multiplied with the error term err_hyp or with the correction term cor_hyp. The incorporation of an error hypothesis using averaged and/or not-averaged quantities of the frequency offset correction values can be written in one embodiment as $$\Delta f_{SEG0}=\Delta f_{0\ averaged/not\_averaged}+\Delta f_{0\ averaged/not\_averaged}\cdot\text{err\_hyp}$$

$$\Delta f_{SEG\ldots}=(\Delta f_{SEG\ldots averaged/not\_averaged}+)+\text{cor\_sign}\cdot(\Delta f_{SEG\ldots averaged/not\_averaged}+)\cdot\text{cor\_hyp} \quad (10)$$

A further possibility is to use not-averaged quantities for the originally applied frequency offset correction values for the actual segments and averaged quantities for the frequency offset correction values for the error term err_hyp and/or the correction term cor_hyp. This method has the advantage that the measurements are burst-by-burst and only a small correction term takes account of the history of several preceding bursts. This scheme may be written in one embodiment as $$\Delta f_{SEG0}=\Delta f_{0\ not\_averaged}+\Delta f_{0\ averaged}\cdot\text{err\_hyp}$$

$$\Delta f_{SEG}=(\Delta f_{SEG\ldots not\_averaged}+)+\text{cor\_sign}\cdot(\Delta f_{SEG\ldots averaged}+)\cdot\text{cor\_hyp}. \quad (11)$$

Although the invention has been illustrated and described with respect to one or more implementations, alterations and/or modifications may be made to the illustrated examples without departing from the spirit and scope of the appended claims. In particular regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for carrier frequency tracking of a received signal having a burst structure, comprising:
   dividing a burst into a number of segments;
   measuring a carrier frequency offset of a first segment within the burst to obtain a first segment carrier frequency offset measurement value; and
   correcting a carrier frequency offset of a second segment within the burst by a second segment carrier frequency offset correction value based on the first segment carrier frequency offset measurement value,
   wherein the second segment carrier frequency offset correction value is substantially equal to the first segment carrier frequency offset measurement value.

2. The method of claim 1, wherein obtaining the second segment carrier frequency offset measurement value comprises:
   measuring a residual carrier frequency offset of the corrected carrier frequency offset second segment within the burst to obtain a second segment residual carrier frequency offset measurement value; and
   combining the second segment carrier frequency offset correction value and the second segment residual carrier frequency offset measurement value.

3. The method of claim 1, wherein the first and second segments are arranged adjacent to each other within the burst.

4. The method of claim 1, wherein:
   the burst comprises a midamble; and
   the first and second segments are arranged on opposite sides of the midamble.

5. A method for carrier frequency tracking of a received signal having a burst structure, comprising:
   dividing a burst into a number of segments;
   measuring a carrier frequency offset of a first segment within the burst to obtain a first segment carrier frequency offset measurement value;
   measuring the carrier frequency offset of a second segment within the burst to obtain a second segment carrier frequency offset measurement value; and
   correcting the carrier frequency offset of a third segment within the burst by a third segment carrier frequency offset correction value based on the first and second segment carrier frequency offset measurement values,
   wherein the third segment carrier frequency offset correction value comprises an average of the first and second segment carrier frequency offset measurement values.

6. The method of claim 5, further comprising:
   correcting the carrier frequency offset of a fourth segment within the burst by a fourth segment carrier frequency offset correction value, wherein the fourth segment carrier frequency offset correction value is substantially equal to the third segment carrier frequency offset correction value.

7. A method for carrier frequency tracking of a received signal having a burst structure, comprising:
   dividing a burst into a number of segments;
   measuring a carrier frequency offset of a first segment within the burst to obtain a first segment carrier frequency offset measurement value;
   measuring the carrier frequency offset of a second segment within the burst to obtain a second segment carrier frequency offset measurement value;
   correcting the carrier frequency offset of a third segment within the burst by a third segment carrier frequency offset correction value based on the first and second segment carrier frequency offset measurement values;
   measuring the carrier frequency offsets of the third segment and a fourth segment to obtain third and fourth segment carrier frequency offset measurement values, respectively; and
   correcting the carrier frequency offset of a fifth segment within the burst by a fifth segment carrier frequency offset correction value based on the third and fourth segment carrier frequency offset measurement values.

8. The method of claim 7, wherein obtaining the third and fourth segment carrier frequency offset measurement values comprises:
   measuring residual carrier frequency offsets of the carrier frequency offset corrected third and forth segments within the burst to obtain third and fourth segment residual carrier frequency offset measurement values;
   combining the third segment carrier frequency offset correction value and the third segment residual carrier frequency offset measurement value to obtain the third segment carrier frequency offset measurement value; and
   combining the fourth segment carrier frequency offset correction value and the fourth segment residual carrier frequency offset measurement value to obtain the fourth segment carrier frequency offset measurement value.

9. A method for carrier frequency tracking of a received signal having a burst structure, comprising:
   dividing a burst into a number of segments;
   measuring a carrier frequency offset of segments within the burst to obtain segment carrier frequency offset measurement values;
   calculating a segment carrier frequency offset correction value for a segment of the burst by taking into account carrier frequency offset measurement information of bursts preceding the burst; and
   correcting a carrier frequency offset of the segment within an actual burst by the segment carrier frequency offset correction value,
   wherein calculating the segment carrier frequency offset correction value for a segment of the burst comprises:
      calculating a variance quantity indicative of a variance of segment carrier frequency offset measurement values of bursts preceding the burst; and
      calculating the segment carrier frequency offset correction value for the segment of the burst based on the carrier frequency offset measurement information of preceding bursts if a quantity derived from the segment carrier frequency offset measurement of the burst falls within predetermined limits.

10. The method of claim 9, wherein in case the quantity derived from the segment carrier frequency offset measurement of the burst falls within the predetermined limits, calculating the segment carrier frequency offset correction value by adding $(1-x)$ times the segment carrier frequency offset correction value of the preceding burst and x times the segment carrier frequency offset measurement value of the burst, with $0<x<1$.

11. The method of claim 10, wherein x comprises an adjustable variable.

12. The method of claim 9, wherein the variance quantity is calculated by combining the value of the variance quantity for the preceding burst with a value indicative of a difference between the segment carrier frequency offset correction value of the preceding burst and the segment carrier frequency offset measurement value of the burst.

13. A method for carrier frequency tracking of a received signal having a burst structure, comprising:
  dividing a burst into a number of segments;
  measuring a carrier frequency offset of segments within the burst to obtain segment carrier frequency offset measurement values;
  calculating segment carrier frequency offset correction values based on the segment carrier frequency offset measurement values;
  calculating a reliability quantity for the burst indicative of a reliability of segment carrier frequency offset measurement values of the burst, one or more preceding bursts, or both, wherein the reliability quantity is calculated based on a number of positive and negative signs of the segment carrier frequency offset measurement values in the burst, the one or more preceding bursts, or both; and
  correcting or not correcting the carrier frequency offsets of the segments within the burst depending on the calculated reliability quantity.

14. A method for carrier frequency tracking of a received signal having a burst structure, comprising:
  dividing a burst into a number of segments;
  measuring a carrier frequency offset of a first segment within the burst to obtain a first segment carrier frequency offset measurement value;
  calculating a second segment carrier frequency offset correction value for a second segment of the burst based on the first segment carrier frequency offset measurement value, or by taking into account carrier frequency offset measurement information of preceding bursts, or both; and
  correcting the carrier frequency offset of the second segment within the burst by the second segment carrier frequency offset correction value that is modified by an error hypothesis value.

15. The method of claim 14, wherein the modified second segment carrier frequency offset correction value comprises the sum of the first segment carrier frequency offset measurement value plus the first segment carrier frequency offset measurement value multiplied by the error hypothesis value.

16. The method of claim 14, further comprising:
  after correcting the carrier frequency offset of the second segment within the burst, checking whether or not the error hypothesis value is too high or too low;
  selectively adapting the error hypothesis value based on the check thereof; and
  correcting the carrier frequency offset of a third segment within the burst using the adapted error hypothesis value.

17. A device for carrier frequency tracking of a received signal having a burst structure, comprising:
  a divider configured to divide a burst into a number of segments;
  a measuring unit configured to measure carrier frequency offsets of the segments, wherein the measured carrier frequency offset of a first segment within the burst is denoted as a first segment carrier frequency offset measurement value; and
  a correction unit configured to correct the carrier frequency offsets of the segments, and wherein the correction unit is further configured to correct the frequency offset of a second segment within the burst by a second segment carrier frequency offset correction value based on the first segment carrier frequency offset measurement value,
  wherein the second segment carrier frequency offset correction value is substantially equal to the first segment carrier frequency offset measurement value.

18. A device for carrier frequency tracking of a received signal having a burst structure, comprising:
  a divider configured to divide a burst into a number of segments;
  a measuring unit configured to measure carrier frequency offsets of the segments, wherein the measured carrier frequency offsets of a first and a second segment within a burst are denoted as a first segment carrier frequency offset measurement value and second segment carrier frequency offset measurement value, respectively; and
  a correction unit configured to correct the carrier frequency offsets of the segments, and wherein the correction unit is further configured to correct the carrier frequency offset of a third segment within the burst by a third segment carrier frequency offset correction value based on the first and second segment carrier frequency offset measurement values,
  wherein the third segment carrier frequency offset correction value comprises an average of the first and second segment carrier frequency offset measurement values.

19. The device of claim 18, wherein the correction unit is further configured to correct the carrier frequency offset of a fourth segment within the burst by a fourth segment carrier frequency offset correction value, wherein the fourth segment carrier frequency offset correction value is substantially equal to the third segment carrier frequency offset correction value.

20. A device for carrier frequency tracking of a received signal having a burst structure, comprising:
  a divider configured to divide a burst into a number of segments;
  a measuring unit configured to measure carrier frequency offsets of the segments, wherein the measured carrier frequency offset of a segment within a burst is denoted as a segment carrier frequency offset measurement value;
  a calculation unit configured to calculate segment carrier frequency offset correction values for the segments, and wherein the calculation unit is further configured to take into account carrier frequency offset measurement information of bursts preceding the burst when calculating a segment carrier frequency offset correction value for a segment of the burst; and
  a correction unit configured to correct the carrier frequency offsets of the segments, and wherein the correction unit is further configured to correct the carrier frequency offset of the segment within the burst by the segment carrier frequency offset correction value,
  wherein when calculating the segment carrier frequency offset correction value for the segment of the burst, the calculation unit further comprises:
    means for calculating a variance quantity indicative of a variance of segment carrier frequency offset measurement values of bursts preceding the burst; and
    means for calculating the segment carrier frequency offset correction value for the segment of the burst based on the carrier frequency offset measurement information of preceding bursts if a quantity derived from the segment carrier frequency offset measurement of the actual burst falls within predetermined limits.

21. The device of claim 20, wherein when the quantity derived from the segment carrier frequency offset measurement of the burst falls within the predetermined limits, the means for calculating the segment carrier frequency offset correction value calculates the segment carrier frequency offset correction value by adding $(1-x)$ times the segment carrier frequency offset correction value of the preceding burst and x times the segment carrier frequency offset measurement value of the burst, with 0<x<1.

22. The device of claim 21, wherein x comprises an adjustable variable.

23. A device for carrier frequency tracking of a received signal having a burst structure, comprising:
   a divider configured to divide a burst into a number of segments;
   a measuring unit configured to measure carrier frequency offsets of the segments, wherein the measured carrier frequency offset of a segment within the burst is denoted as a segment carrier frequency offset measurement value;
   a first calculation unit configured to calculate segment carrier frequency offset correction values based on segment carrier frequency offset measurement values;
   a second calculation unit configured to calculate a reliability quantity for the burst indicative of a reliability of segment carrier frequency offset measurement values of the burst, one or more preceding bursts, or both, wherein the reliability quantity is calculated based on the number of positive and negative signs of the segment carrier frequency offset measurement values in the burst, one or more preceding bursts, or both; and
   a correction unit configured to correct the carrier frequency offsets of the segments within the burst depending on the value of the reliability quantity.

24. A device for carrier frequency tracking of a received signal having a burst structure, comprising:
   a divider configured to divide a burst into a number of segments;
   a measuring unit configured to measure carrier frequency offsets of the segments, wherein a measured carrier frequency offset of a first segment within the burst is denoted as a first segment carrier frequency offset measurement value;
   a calculation unit configured to calculate segment carrier frequency offset correction values for the segments, wherein the calculation unit is further configured to calculate a second segment carrier frequency offset correction value of the burst based on the first segment carrier frequency offset measurement value, or by taking into account carrier frequency offset measurement information of bursts preceding the actual burst, or both; and
   a correction unit configured to correct the carrier frequency offsets of the segments, wherein the correction unit is further configured to correct the frequency offset of the second segment within the burst by the second segment carrier frequency offset correction value that is modified by an error hypothesis value.

25. The device of claim 24, wherein the modified second segment carrier frequency offset correction value comprises the sum of the first segment carrier frequency offset measurement value plus the first segment carrier frequency offset measurement value multiplied by the error hypothesis value.

26. The device of claim 24, further comprising:
   an error hypothesis adjustment unit configured to check whether or not the error hypothesis value is too large or too small after the carrier frequency offset of the second segment within the burst has been corrected, and to selectively adapt the error hypothesis value in response thereto, and wherein the correction unit is further configured to use the adapted error hypothesis value for correcting the carrier frequency offset of a third segment within the burst.

27. A device for carrier frequency tracking of a received signal having a burst structure, comprising:
   divider means for dividing a burst into a number of segments;
   measuring means for measuring carrier frequency offsets of the segments, wherein the measured carrier frequency offset of a first segment within the burst is denoted as a first segment carrier frequency offset measurement value; and
   correction means for correcting the carrier frequency offsets of the segments, the correction means being configured to correct the frequency offset of a second segment within the burst by a second segment carrier frequency offset correction value based on the first segment carrier frequency offset measurement value,
   wherein the second segment carrier frequency offset correction value is substantially equal to the first segment carrier frequency offset measurement value.

* * * * *